(12) United States Patent
Kim et al.

(10) Patent No.: US 7,630,694 B2
(45) Date of Patent: Dec. 8, 2009

(54) REMOTE ACCESS UNIT AND OPTICAL NETWORK FOR BIDIRECTIONAL WIRELESS COMMUNICATION USING THE SAME

(75) Inventors: Yong-Gyoo Kim, Seoul (KR); Seong-Taek Hwang, Pyeongtaek-si (KR); Byung-Jik Kim, Seongnam-si (KR); Gyu-Woong Lee, Suwon-si (KR); Hoon Kim, Suwon-si (KR); Sang-Ho Kim, Seoul (KR); Sung-Kee Kim, Suwon-si (KR); Han-Lim Lee, Seoul (KR); Jae-Hoon Lee, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 495 days.

(21) Appl. No.: 11/395,806

(22) Filed: Mar. 31, 2006

(65) Prior Publication Data
US 2007/0022460 A1    Jan. 25, 2007

(30) Foreign Application Priority Data
Jul. 19, 2005    (KR) .............. 10-2005-0065388
Aug. 29, 2005    (KR) .............. 10-2005-0079399

(51) Int. Cl.
*H01Q 11/12* (2006.01)

(52) U.S. Cl. .............. 455/127.4; 455/130; 455/101; 455/102; 455/103

(58) Field of Classification Search .............. None
See application file for complete search history.

(56) References Cited

U.S. PATENT DOCUMENTS 6,018,520 A * 1/2000 Okada .............. 370/336

* cited by examiner

*Primary Examiner*—Patrick N. Edouard
*Assistant Examiner*—Dai A Phuong
(74) *Attorney, Agent, or Firm*—Cha & Reiter, LLC

(57) ABSTRACT

Disclosed is a remote access unit for transmitting and receiving upstream and downstream data in which channels having different transmission scheme are multiplexed, and an optical network for bi-directional wireless communication using same. The remote access unit includes an antenna for receiving the downstream data and wirelessly transmitting same and for receiving the upstream data and providing same to the remote access unit, a switch for outputting downstream time division channels of the downstream data to the antenna and for receiving upstream time division channels of the upstream data from the antenna, and a controller for controlling the switch in order to prevent the upstream and downstream time division channels from overlapping.

5 Claims, 12 Drawing Sheets

REMOTE ACCESS UNIT AND OPTICAL NETWORK FOR BIDIRECTIONAL WIRELESS COMMUNICATION USING THE SAME

CLAIM OF PRIORITY

This application claims the benefit of the earlier filing dates of those patent applications, each entitled "Remote Access Unit and Optical Network for Bidirectional Wireless Communication Using the Same" filed in the Korean Intellectual Property Office on Aug. 29, 2005 and Jul. 19, 2005, and assigned Serial Nos. 2005-79399 and 2005-65388, respectively, the contents of which are hereby incorporated by reference.

BACKGROUND OF THE INVENTION

1. Field of the Invention

The present invention relates to a technology of transmitting radio frequency for wireless communication, and more particularly to a remote access unit for transmitting and receiving channels having different transmission schemes in a bi-direction.

2. Description of the Related Art

In recent wireless communication, various kinds of wireless communication services are provided. These services are referred to as 2G wireless communication service, 3G wireless communication service, wireless local area network (LAN), wireless Internet, etc. Additional wireless communication services use a radio-over-fiber type optical network such as an optical communication network combined with a wireless transmission system. The radio-over-fiber type optical network converts radio signals into optical signals and then transmits the radio signals as a form of the optical signals and converts the optical signals into radio signals to transmit the radio signals wirelessly.

FIG. 1A illustrates a schematic block diagram showing a conventional remote access unit. Referring to FIG. 1A, the conventional remote access unit 100 including a first amplifier 110 for amplifying downstream data in which time division channels (TDD) and frequency division channels (FDD) are multiplexed, a second amplifier 150 for amplifying upstream signals received wirelessly, an antenna 130 for receiving a upstream data wirelessly and transmitting the downstream data wirelessly, a circulator 120 for providing the downstream data to the antenna 130 and also providing the upstream data received from the antenna toward the second amplifier 150, and a filter 140 located between the circulator 120 and the second amplifier 150.

FIG. 1B illustrates an exemplary wave form of upstream data in which upstream time division channels, upstream frequency division channel and frequency division channels of the downstream data are multiplexed. FIG. 1B illustrates a state in which some of the downstream frequency division channels are removed from the upstream data by the filter 140.

FIG. 2 illustrates an exemplary schematic block diagram showing a structure of an optical network including the conventional remote access unit shown in FIG. 1A. Referring to FIG. 2, the conventional optical network 200 includes a central station 210 and a remote access unit 220. The central station 210 includes an electric-optical converter 211 for converting downstream data into downstream optical signals, and a photo-electric converter 212 for converting upstream optical signals into upstream data.

The remote access unit 220 includes a photo-electric converter 221 for photo-electrically converting the downstream optical signals into downstream data, a first amplifier 222 for amplifying the downstream data, an electric-optical converter 226 for electric-optically converting the upstream data into upstream optical signals, and a second amplifier 225 for amplifying the upstream data. A circulator 223 is located between the first and second amplifiers 222 and 225, which is connected to an antenna 224.

Therefore, the conventional remote access unit and the optical network including the same can input and output signals in which time division channels and frequency division channels are multiplexed, but cannot separate and process channels from one another, based on transmitting schemes. Thus, a part of downstream signals is mixed with upstream signals, thereby causing a deterioration of elements for processing upstream signals.

SUMMARY OF THE INVENTION

Accordingly, the present invention has been made to solve the above-mentioned problems occurring in the prior art and provides additional advantages, by providing a remote access unit which can perform bi-directional wireless communication using upstream and downstream signals in which time division channels and frequency division channels are multiplexed, and which also can restrict a deterioration of elements caused by mixing the transmitted signals in opposite directions.

According to an aspect of the present invention, there is provided a remote access unit for transmitting and receiving upstream and downstream data in which channels having different schemes are multiplexed, which comprises an antenna for transmitting and receiving the downstream data wirelessly and for inputting the upstream data wirelessly received into the remote access unit, a switch for outputting downstream time division channels of the downstream data to the antenna and for receiving upstream time division channels of the upstream data inputted through the antenna, and a controller for controlling the switch in order to prevent the upstream and downstream time division channels from overlapping.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, preferred embodiments of the present invention will be described in detail with reference to the accompanying drawings. For the purposes of clarity and simplicity, a detailed description of known functions and configurations incorporated herein will be omitted to avoid making the subject matter of the present invention unclear.

Figure 1A:
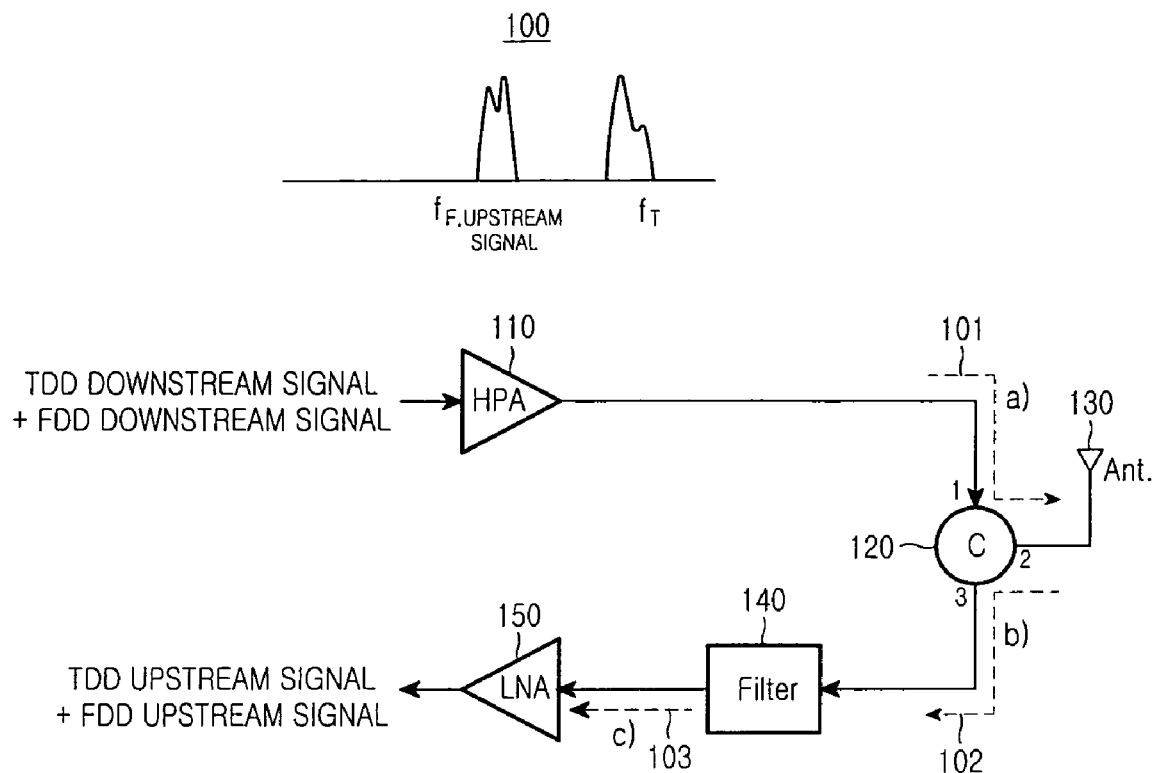
FIGS. 1A-1C illustrate a schematic block diagram showing the conventional remote access unit and multiplexed signal composition.
Figure 1B:
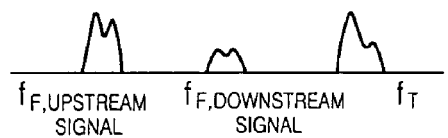
Figure 1C:
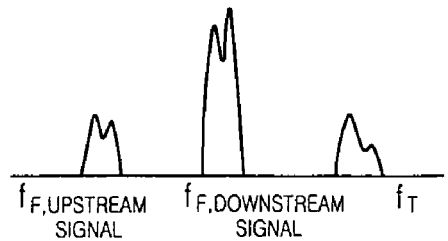
Figure 2:
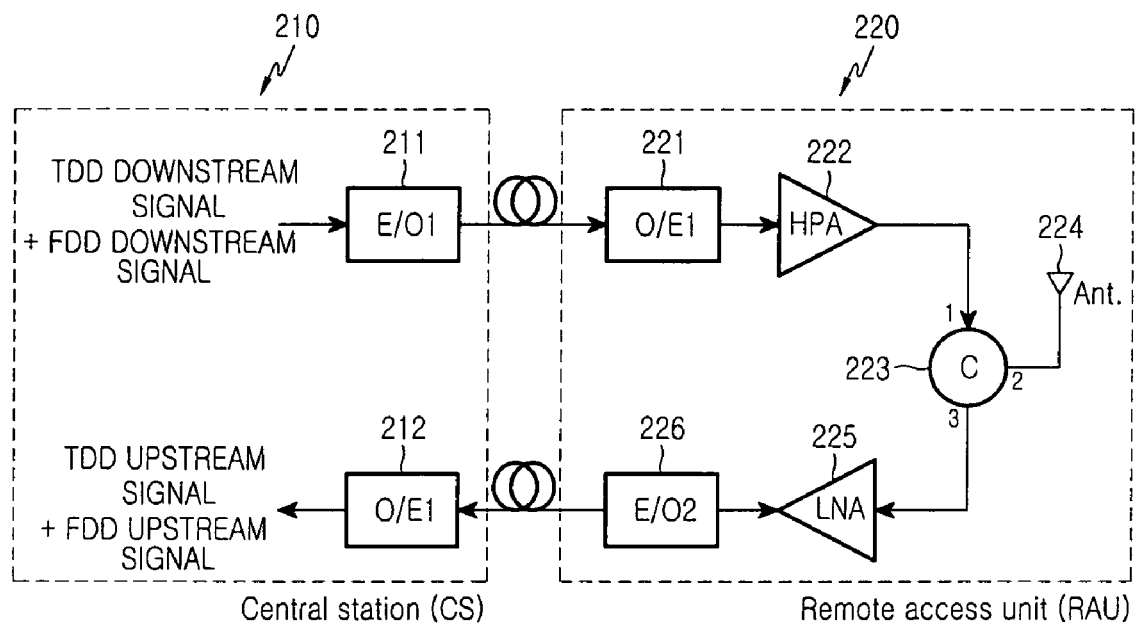
FIG. 2 illustrates a schematic block diagram showing the structure of an optical network including the conventional remote access unit.
Figure 3:
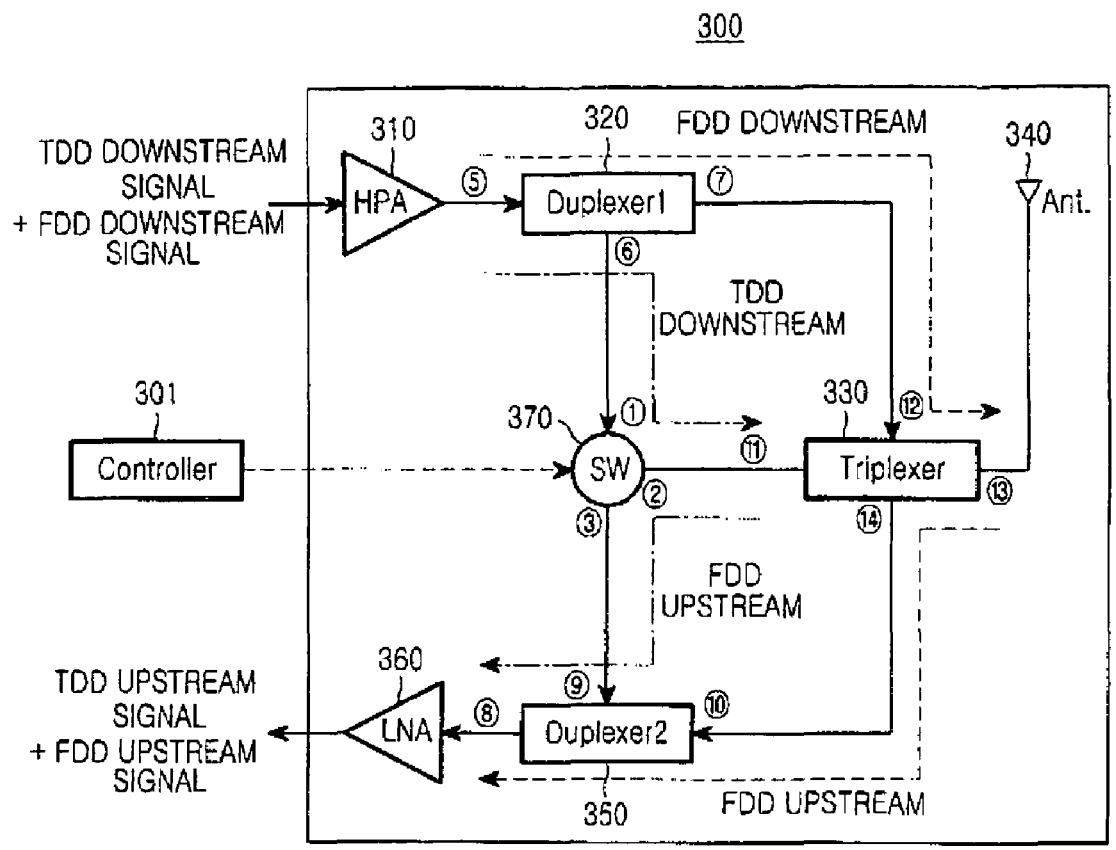
FIG. 3 illustrates a schematic block diagram showing the structure of a remote access unit according to the first embodiment of the present invention.
Figure 4A:
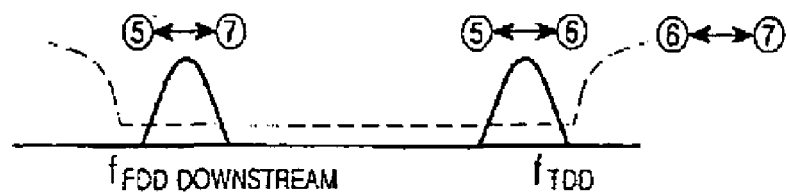
FIGS. 4A through 4C present graphs illustrating a process of treating data in the remote access unit shown in FIG. 3.
Figure 4B:
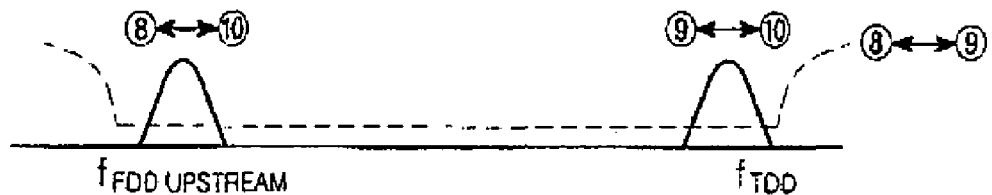
Figure 4C:
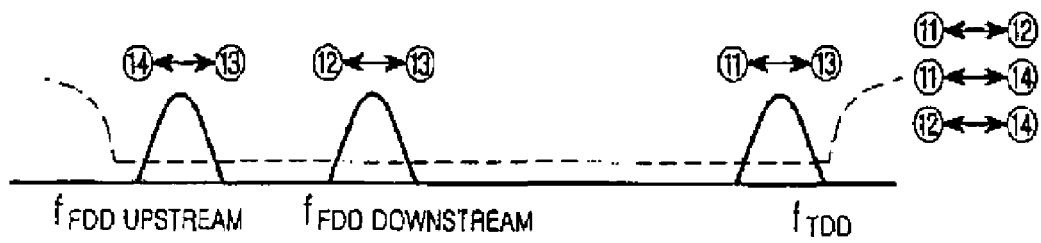

FIG. 3 illustrates a schematic block diagram showing the structure of a remote access unit according to the first embodiment of the present invention, and FIGS. 4A through 4C presents graphs illustrating a process of treating data in the remote access unit shown in FIG. 3. Referring to FIG. 3 and FIGS. 4A through 4C, the remote access unit 300 according to this embodiment of the present invention includes first and second duplexer 320 and 350, a triplexer 330, downstream and upstream amplifiers 310 and 360, a switch 370, a controller 301, and an antenna 340. The remote access unit 300 transmits downstream data, in which downstream time division channels and downstream frequency division channels are multiplexed, through the antenna 340 wirelessly, and receives wireless upstream data, in which upstream time division channels and upstream frequency channels are multiplexed.

The first duplexer 320 divides the downstream data into downstream time division channels and downstream frequency division channels. As shown in FIG. 4A, the down frequency division channels are outputted from port 7 to a input port 12 triplexer 330, while the downstream time division channels are inputted into the triplexer 330 through the switch 370, represented as proceeding from port 6 of duplexer 1 to input port 1 of switch 370 and from output port 2 of switch 370 to port 11 of triplexer 330.

As shown in FIG. 4B, the second duplexer 350 combines the upstream frequency division channels directly inputted from the triplexer 330 (i.e. output port 14 of triplexer 330 to input port 10 of duplexer 350) with the upstream time division channels inputted through the switch 370 so as to output the resultant toward the first upstream amplifier 360.

The triplexer 330 is located between the first and second duplexers 320 and 350. As shown in FIG. 4C, the triplexer 330 divides the upstream data inputted from the antenna 340 into upstream time division channels and upstream frequency division channels, while combining the downstream time division channels and the downstream frequency division channels with the downstream data and outputting the downstream data toward the antenna 340.

The switch 370 is located between the first and second duplexers 320 and 350, and is connected with the triplexer 330. Switch 370 is connected to the triplexer 330 or the second duplexer 350 based on control signals of the controller 301. Specifically, the switch 370 outputs the downstream time division channels to the triplexer 330 or outputs the upstream time division channels to the second duplexer 350, depending on the control signals of the controller 301.

The downstream amplifier 310 amplifies the downstream data and inputs the amplified downstream data into the first duplexer 320. The upstream amplifier 360 amplifies the upstream data inputted from the second duplexer 350 and outputs the amplified upstream data outside the remote access unit 300. A high power amplifier may be used as the first downstream amplifier 310, and a low noise amplifier may be used as the first upstream amplifier 360.

The switch 370 and the triplexer 330 have an excellent capability for dividing channels between ports as compared with an element such as a circulator. Further, the switch 370 and the triplexer 330 can remove downstream data reflected by the antenna that is introduced into the upstream data. Therefore, the present invention restrains the downstream data from being introduced into the upstream data, thereby preventing deterioration of elements for upstream link from occurring, and also preventing a data loss and a malfunction of the elements, which may be caused due to the deterioration of the elements.

Figure 5:
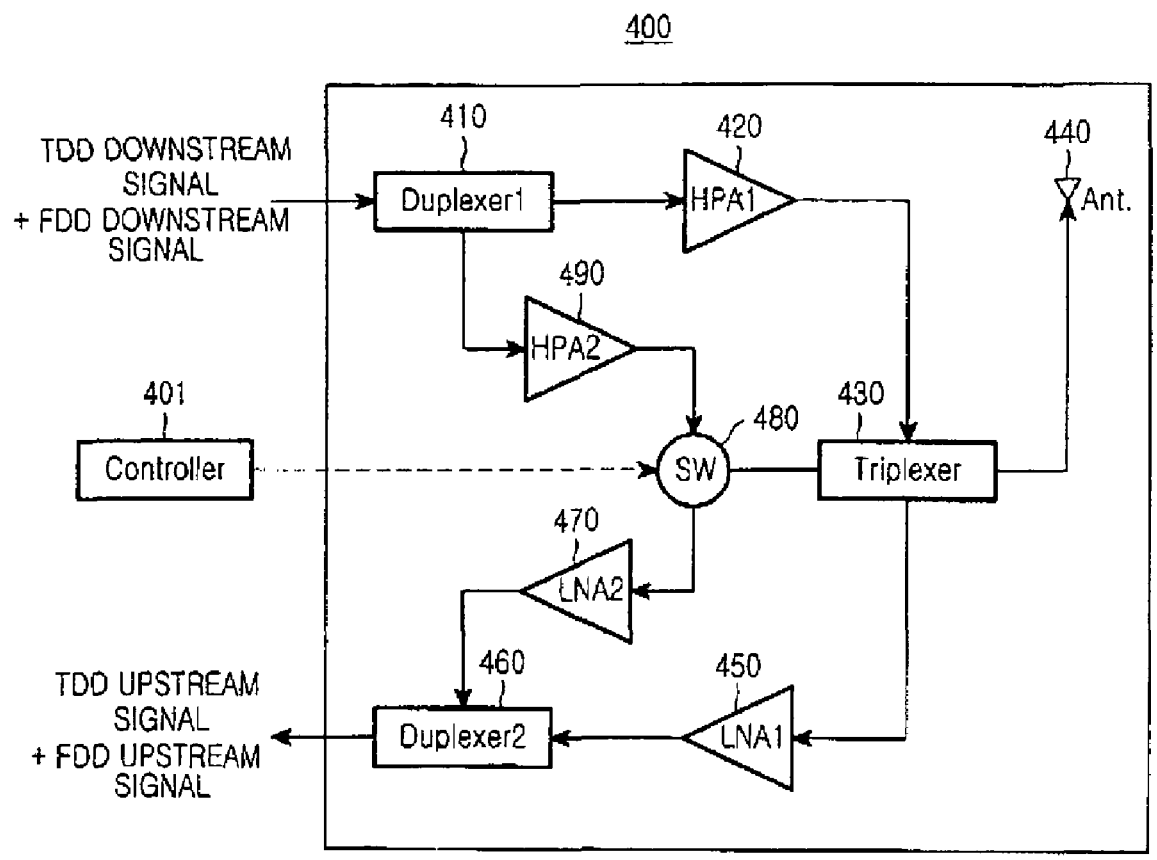
FIG. 5 illustrates a schematic block diagram showing the structure of a remote access unit according to the second embodiment of the present invention.

FIG. 5 illustrates a schematic block diagram showing the structure of a remote access unit according to the second embodiment of the present invention. Referring to FIG. 5, the remote access unit 400 according to this embodiment of the present invention includes first and second duplexers 410 and 460, a triplexer 430, a first downstream amplifier 420, a first upstream amplifiers 450, a second downstream amplifier 490, a second upstream amplifier 470, a switch 480, a controller 401 controlling the switch 480 and an antenna 440 for transmitting downstream data wirelessly and inputting upstream data received wirelessly into the remote access unit 400.

The first duplexer 410 divides the downstream data into downstream time division channels and downstream frequency division channels, as previously discussed. Then, the first duplexer 410 outputs the downstream time division channels toward the second downstream amplifier 490, while outputting the downstream frequency division channels toward the first downstream amplifier 420. The first downstream amplifier 420 amplifies and outputs the downstream frequency division channels to the triplexer 430, and the second downstream amplifier 490 amplifies and outputs the downstream time division channels to the switch 480.

The triplexer 430 combines the downstream time division channels inputted from the switch 480 and the downstream frequency division channels inputted from the first amplifier 420 with the downstream data, and then outputs the downstream data toward the antenna 440. The triplexer 430 further receives the upstream data inputted through the antenna 440 and divides it into upstream time division channels and upstream frequency division channels. Furthermore, the triplexer 430 outputs the upstream time division channels to the second upstream amplifier 470 through the witch 480, while outputting the upstream frequency division channels to the first upstream amplifier 450. The first upstream amplifier 450 amplifies and outputs the upstream frequency division channels toward the second duplexer 460, and the second downstream amplifier 470 amplified and outputs the upstream time division channels toward the second duplexer 460.

The switch 480 is connected to the triplexer 430 or the second upstream amplifier 470, depending on control signals of the controller 401. Specifically, the switch 480 outputs the downstream time division channels to the triplexer 430, or outputs the upstream time division channels to the second duplexer 460 through the second upstream amplifier 470.

The second duplexer 460 combines the upstream time division channels inputted from the second upstream amplifier 470 and the upstream frequency division channels inputted from the first upstream amplifier 450 with the upstream data and then outputs the upstream data.

Figure 6:
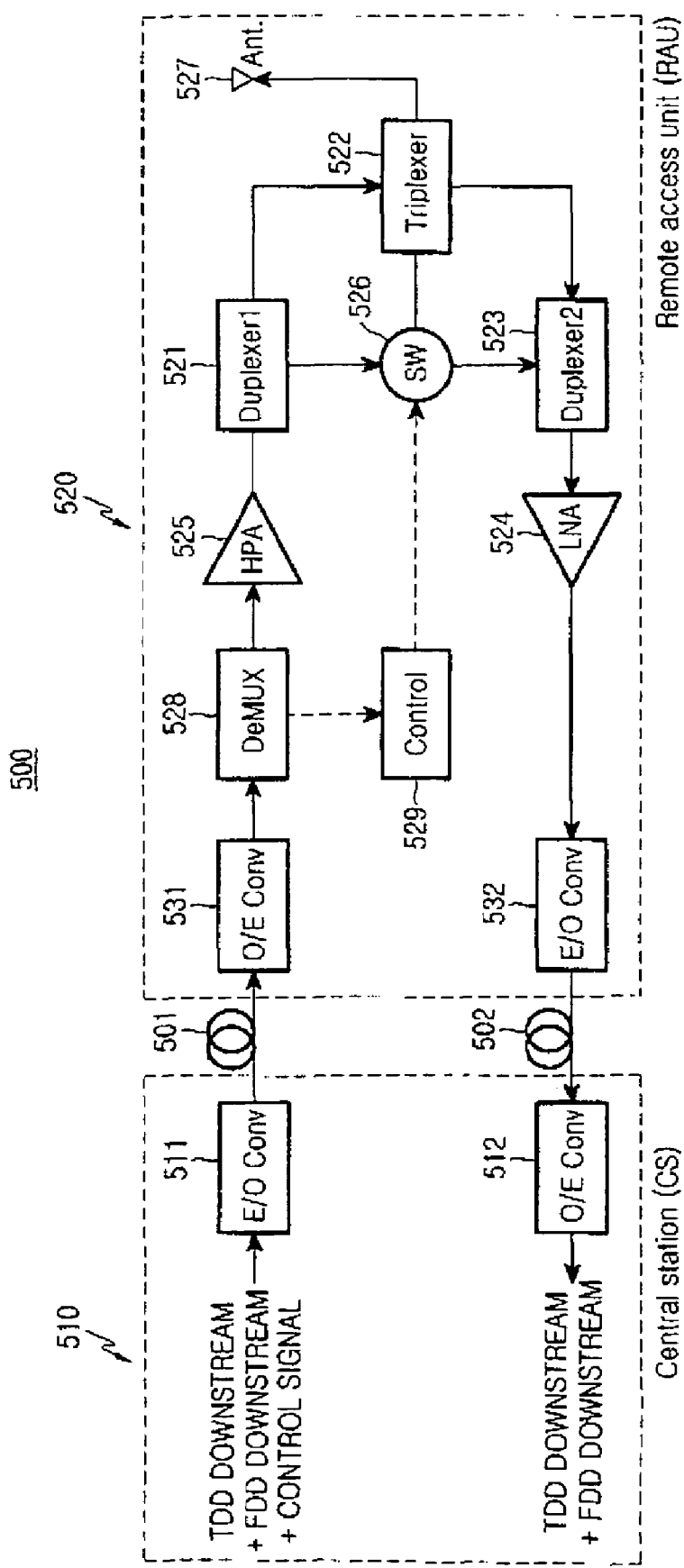
FIG. 6 illustrates a schematic block diagram showing the structure of an optical network for bi-directional communication according to the third embodiment of the present invention.

FIG. 6 illustrates a schematic block diagram showing the structure of an optical network for bi-directional communication according to a third embodiment of the present invention. Referring to FIG. 6, the optical network 500 according to this embodiment of the present invention includes a central station 510, a remote access unit 520, and first and second optical cables 501 and 502 for linking the central station 510 and the remote access unit 520.

The first optical cable 501 transmits downstream optical signals toward the remote access unit 520, and the second optical cable 502 transmits upstream optical signals toward the central station 510.

The central station 510 includes an electric-optical converter for electric-optically converting the downstream data into the downstream optical signals and outputting the downstream optical signals to the remote access unit 620, and a photo-electric converter 512 for photo-electrically converting the upstream optical signals inputted from the remote access unit 520 into the upstream data. The downstream data includes multiplexed downstream frequency division channels and downstream time division channels, and control signals. The upstream data includes multiplexed upstream frequency division channels and upstream time division channels.

The remote access unit 520 includes downstream and upstream amplifiers 525 and 524, a downstream photo-electric converter 531, an upstream electric-optical converter 532, first and second duplexers 521 and 523, a switch 526, a triplexer 522, an antenna 527 wirelessly transmitting the downstream data and receiving the upstream data, a controller 529, and a demultiplexer 528.

The downstream photo-electric converter 531 is linked to the downstream electric-optical converter 511 of the central station by means of the first optical cable 501. Photo-electric converter 531 converts the downstream optical signals into the downstream data and then outputs the downstream data toward the demultiplexer 528. The upstream electric-optical converter 532 is linked to the upstream photo-electric converter 512 of the central station 510 by means of the second optical cable 502. The electro-optical 532 converts the upstream data into the upstream optical signal and then output the optical signals to the central station 510.

The demultiplexer 528 divides the downstream data and control signals from each other, and then outputs the control signals to the controller 529 and the downstream data toward the downstream amplifier 525.

The first duplexer 521 divides the downstream data inputted from the downstream amplifier 525 into downstream time division channels and downstream frequency division channels, and then outputs the downstream time division channels to the switch 526 and outputs the downstream frequency division channels toward the triplexer 522.

The triplexer 522 divides the upstream data inputted through the antenna 527 into upstream time division channels and upstream frequency division channels, and then outputs the upstream time division channels to the second duplexer 523 through the switch 526 and directly outputs the upstream frequency division channels toward the second duplexer 523. Furthermore, the triplexer 522 combines the downstream frequency division channels inputted from the first duplexer 521 and the downstream time division channels inputted from the switch 526 with downstream data, and then outputs the downstream data toward the antenna 527.

The second duplexer 523 combines the upstream time division channels and the upstream frequency division channels with the upstream data and then outputs the upstream data. The upstream amplifier 524 amplifies and outputs the upstream data toward the upstream electric-optical converter 532.

The switch 526 selectively connects the first duplexer 521 or the second duplexer 523 to the triplexer 522, depending on control signals of the controller 529.

Figure 7:
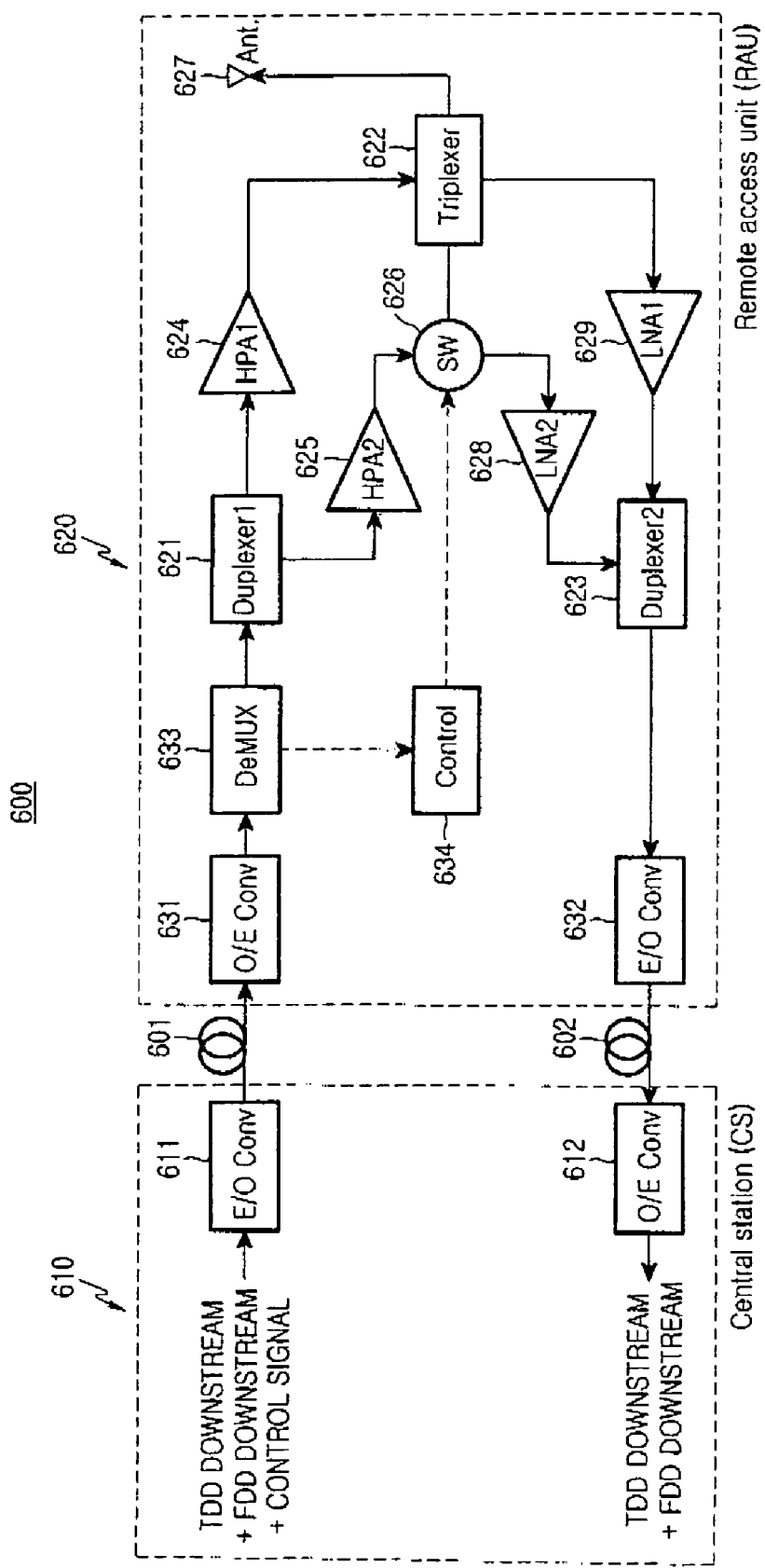
FIG. 7 illustrates a schematic block diagram showing the structure of an optical network for bi-directional communication according to the fourth embodiment of the present invention.

FIG. 7 illustrates a schematic block diagram showing the structure of an optical network for bi-directional communication according to a fourth embodiment of the present invention. Referring to FIG. 7, the optical network 600 according to this embodiment of the present invention includes a central station 610, a remote access unit 620, and first and second optical cables 601 and 602 for linking the central 610 and the remote access unit 620.

The central station 610 includes a downstream electric-optical converter 611 for electric-optically converting downstream data into downstream optical signals and outputting the downstream optical signals toward the remote access unit 620, and an upstream photo-electric converter 612 for photo-electrically converting upstream optical signals received from the remote access unit 620 into upstream data.

The remote access unit 610 includes first and second downstream amplifiers 624 and 625, first and second upstream amplifiers 629 and 628, a downstream photo-electric converter 631, an upstream electric-optical converter 632, first and second duplexers 621 and 623, a switch 626, a triplexer 622, an antenna 627 transmitting downstream data and receiving upstream data, a controller 634, and a demultiplexer 633.

The demultiplexer 633 separates control signals from the downstream data and then outputs the control signals to the controller 634. The controller 634 controls the switch 626 depending on the control signals. The switch 626 selectively connects the second downstream amplifier 625 or the second upstream amplifier 628 to the triplexer 633 according to the control signals of the controller 634.

The first duplexer 621 divides the downstream data inputted through the demultiplexer 633 into downstream frequency division channels and downstream time division channels, which in turn outputs the downstream time division channels toward the second downstream amplifier 625 and the downstream frequency division channels to the first downstream amplifier 624.

The first downstream amplifier 624 is located between the first duplexer 621 and the triplexer 622, and amplifies and outputs the downstream frequency division channels toward the triplexer 622. The second downstream amplifier 625 is disposed between the first duplexer 621 and the switch 626, which amplifies and outputs the downstream time division channels toward the switch 626.

The first upstream amplifier 629 is located between the triplexer 622 and the second duplexer 623, and amplifies and outputs the upstream frequency division channels toward the second duplexer 623. The second upstream amplifier 628 is disposed between the switch 626 and the second duplexer 623, and amplifies and outputs the upstream time division channels to the second duplexer 623.

The second duplexer 623 combines the upstream time division channels and the upstream frequency division channels into the upstream data stream and then outputs the upstream data toward the upstream electric-optical converter 632. The upstream electric-optical converter 632 converts the upstream data into upstream optical signals and outputs the upstream optical signals to the central station 610.

Figure 8:
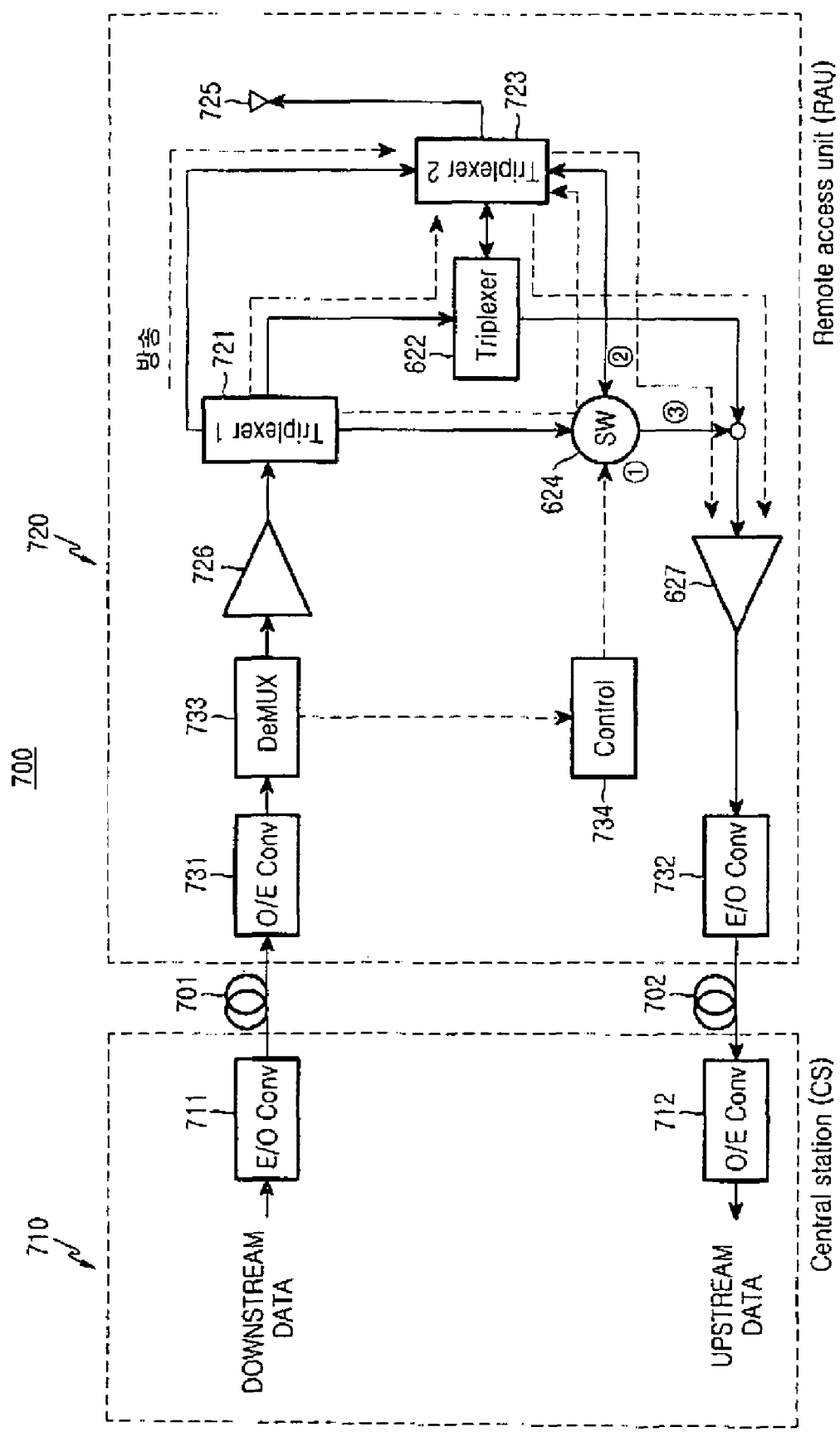
FIG. 8 illustrates a schematic block diagram showing the structure of an optical network for bi-directional communication according to the fifth embodiment of the present invention.

FIG. 8 illustrates a schematic block diagram showing the structure of an optical network for bi-directional communication according to a fifth embodiment of the present invention. Referring to FIG. 8, the optical network 700 according to this embodiment of the present invention includes a central station 710, a remote access unit 720, and first and second optical cables 701 and 702 for linking the central station 710 and the remote access unit 720.

The central station 710 includes an upstream photo-electric converter 712 for photo-electrically converting upstream optical signals into upstream data and then detecting the upstream data, and a downstream electric-optical converter 711 for electric-optically converting downstream data into downstream optical signals and transmitting the downstream optical signals.

The remote access unit 720 includes an antenna 725, a controller 725, a demultiplexer 733, a first triplexer 721, a second triplexer 723, a duplexer 722, a switch 724, downstream and upstream amplifiers 726 and 727, a downstream photo-electric converter 731, and an upstream electric-optical converter 732.

The downstream photo-electric converter 731 converts the downstream optical signals inputted through the first optical cable 701 into the downstream data.

The demultiplexer 733 is located between the downstream amplifier 726 and the downstream photo-electric converter 731, and divides or separates control signals from the downstream data inputted from the downstream photo-electric converter 731 and outputs the control signals to the controller 734.

Figure 9:
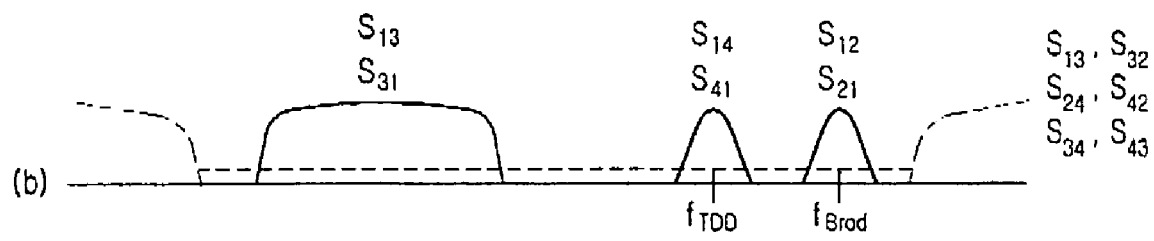
FIGS. 9 and 10 presents graphs illustrating the operation of the optical network shown in FIG. 8.
Figure 10:
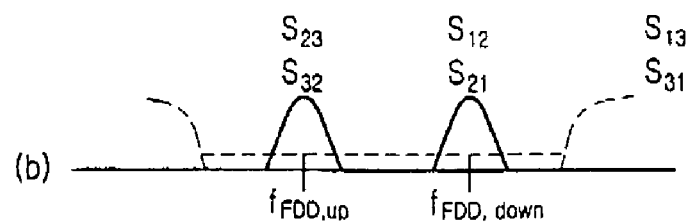

FIGS. 9 and 10 represents graphs illustrating the operation of the optical network shown in FIG. 8, wherein FIG. 9 shows frequency response characteristics of the first triplexer 721 and the second triplexers 723 and FIG. 10 shows the frequency response characteristic of a duplexer 722. In this illustrative example, $S_{12}$ represents the broadcasting channel, $S_{13}$ represents the downstream frequency division channels, $S_{14}$ represents the downstream time division channels, $S_{31}$ represents the upstream frequency division channels and $S_{41}$ represents the upstream time division channels.

As shown in FIG. 9, the first triplexer 721 divides or separates the downstream data inputted from the downstream amplifier 726 into broadcasting channels, downstream time division channels, and downstream frequency division channels. The downstream time division channels are outputted to the switch 724, and the broadcasting channels are outputted to the second triplexer 723. Furthermore, the downstream frequency division channels are outputted to the duplexer 722.

As shown in FIG. 9, the second triplexer 723 divides or separates the upstream data received through the antenna 725 into upstream time division channels and upstream frequency division channels. The upstream time division channels are outputted toward the switch 724. Also, the upstream frequency division channels are outputted toward the duplexer 722. Furthermore, the second triplexer 723 combines the upstream time division channels inputted from the switch 724 and the downstream frequency division channels inputted from the duplexer 722 with the broadcasting channels inputted from the first triplexer 721 so as to obtain and output downstream data to the antenna 725.

As shown in FIG. 10, the duplexer 722 outputs the downstream frequency division channels inputted from the first triplexer 721 toward the second triplexer 723, while outputting the upstream frequency division channels inputted from the second triplexer 723 to the upstream amplifier 727.

The downstream amplifier 726 amplifies and outputs the downstream data inputted from the demultiplexer 733. Meanwhile, the upstream amplifier 727 amplifies and outputs the upstream time division channels inputted from the switch 724 and the upstream frequency division channels inputted from the duplexer 722 and then outputs them to the upstream electric-optical converter 732.

The upstream electric-optical converter 732 converts the upstream data into upstream optical signals which are transmitted through the second optical cable 702 to the central station 710.

The switch 724 outputs downstream time division channels divided from the downstream data toward the antenna 725 through the second triplexer 723, while receiving the upstream time division channels divided by the second triplexer 723 from the upstream data inputted through the antenna. Then, the upstream time division channels are then inputted into the upstream amplifier 727 from the switch 724.

The controller 734 controls the switch 724 so that the downstream time division channels and the upstream time division channels do not overlap. Specifically, the switch 724 is controlled by the controller 734 to prevent the upstream and downstream time division channels from overlapping.

Figure 11:
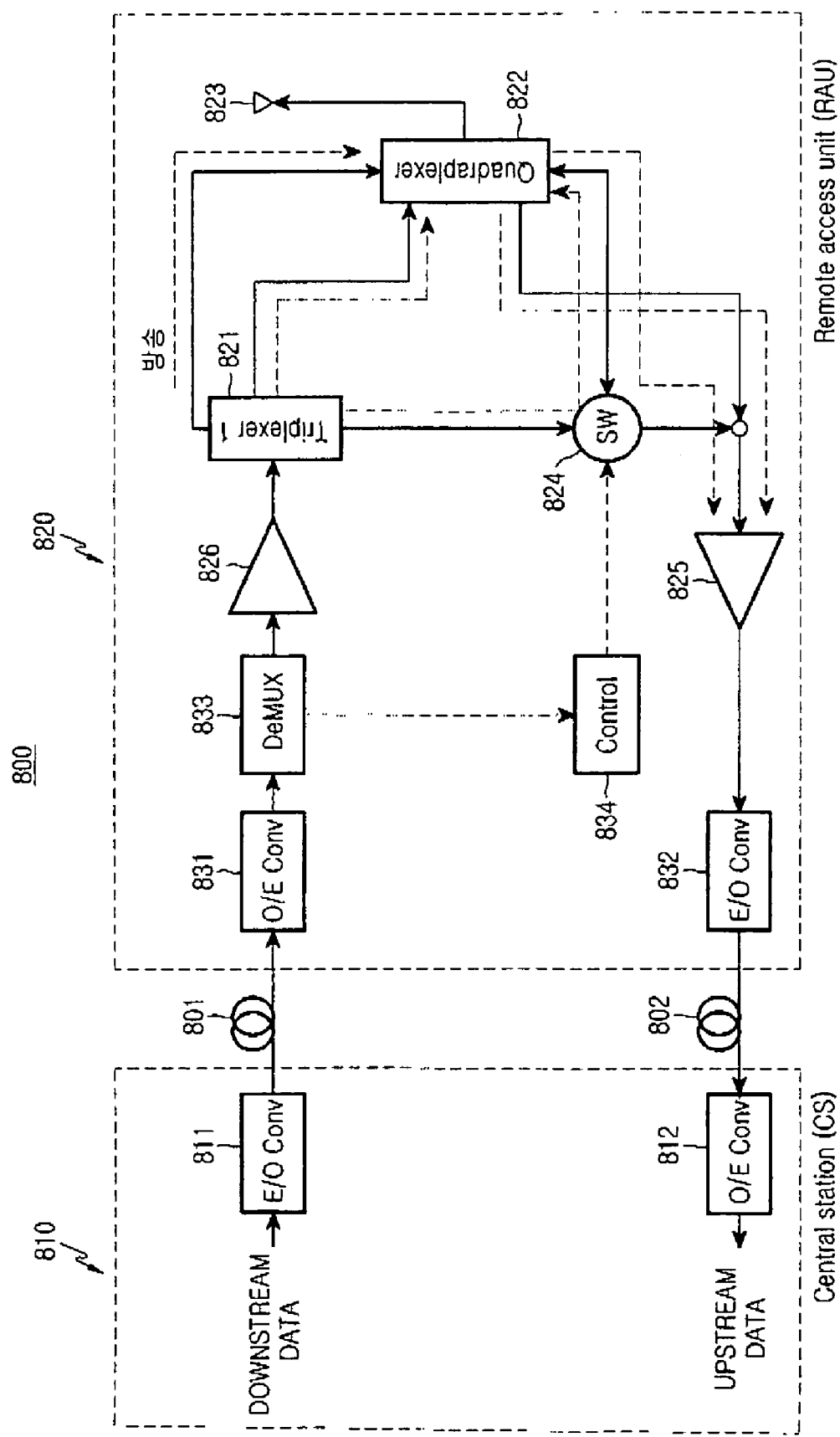
FIG. 11 illustrates a schematic block diagram showing the structure of an optical network for bi-directional communication according to the sixth embodiment of the present invention.

FIG. 11 illustrates a schematic block diagram showing a structure of an optical network for bi-directional communication according to a sixth embodiment of the present invention. The optical network 600 according to this embodiment of the present invention includes a central station 810, a remote access unit 820, and first and second optical cables 801 and 802 for linking the central station 810 and the remote access unit 820. The first optical cable 801 transmits downstream optical signals from the central station 810 to the remote access unit 820, and the second optical cable 802 transmits upstream optical signals from the remote access unit 820 to the central station 810.

The central station 810 includes an upstream photo-electric converter 812 for photo-electrically converting upstream optical signals into upstream data and then detecting the upstream data, and a downstream electric-optical converter 811 for electric-optical converting downstream data into downstream optical signals.

The remote access unit 820 includes an antenna 823, an upstream electric-optical converter 832 for converting the upstream data into upstream optical signals, a downstream photo-electric converter 831 for converting the downstream optical signals into the downstream data, a switch 824 for outputting downstream time division channels, divided from the downstream data, to the antenna 823 and for receiving upstream time division channels, divided from the upstream data, inputted through the antenna 823, a controller 834 for controlling the switch 824 to prevent the downstream time division channels and the upstream time division channels from overlapping, a demultiplexer 833, upstream and downstream amplifiers 825 and 826, a triplexer 821, and a multiplexing division coupler 822.

The demultiplexer 833 is located between the downstream photo-electric converter 831 and the downstream amplifier 826, and separates control signals from the downstream data and outputs the control signals to the controller 834.

The triplexer 821 divides the downstream data inputted from the downstream amplifier 826 into broadcasting channels, downstream time division channels, and downstream frequency division channels. Triplexer 821 outputs the downstream time division channels toward the switch, while the downstream frequency division channels and the broadcasting channels are inputted into the multiplexing division coupler 822 through corresponding pathways.

Figure 12:
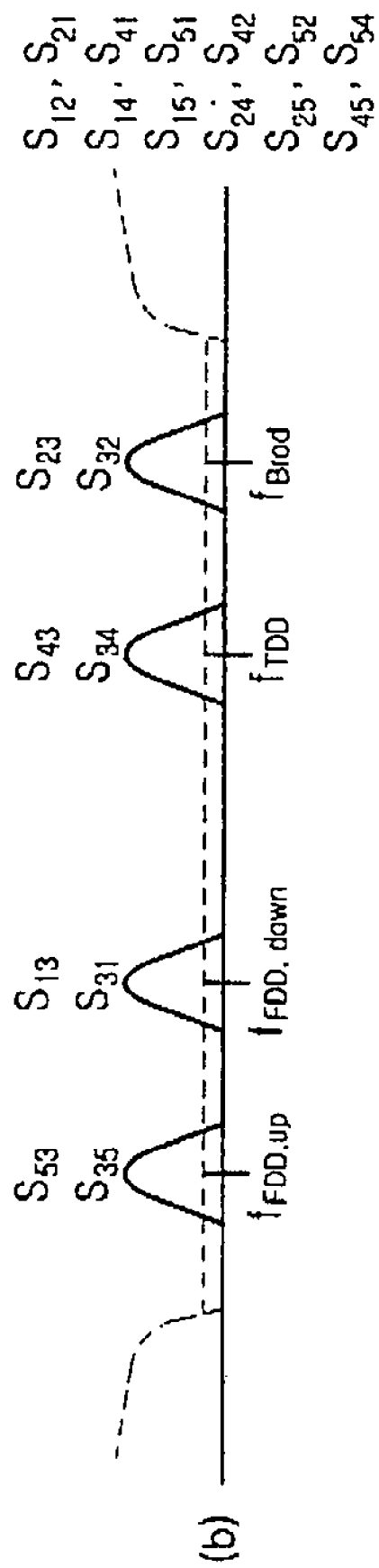
FIG. 12 illustrates a graph illustrating the operation of the optical network shown in FIG. 11.

FIG. 12 is a graph illustrating the operation of the optical network shown in FIG. 11, which shows the operation of the multiplexing division coupler. As shown in FIG. 12, the multiplexing division coupler 822 combines the broadcasting channels and the downstream frequency division channels, which are divided by the triplexer 821, and the downstream time division channels inputted from the switch 824 with the downstream data so as to output the downstream data toward the antenna 823 and divides the upstream data received through the antenna 823 into upstream time division channels and upstream frequency division channels so as to output the upstream time division channels to the switch 824 and output the upstream frequency division channels toward the upstream amplifier 825.

Figure 13:
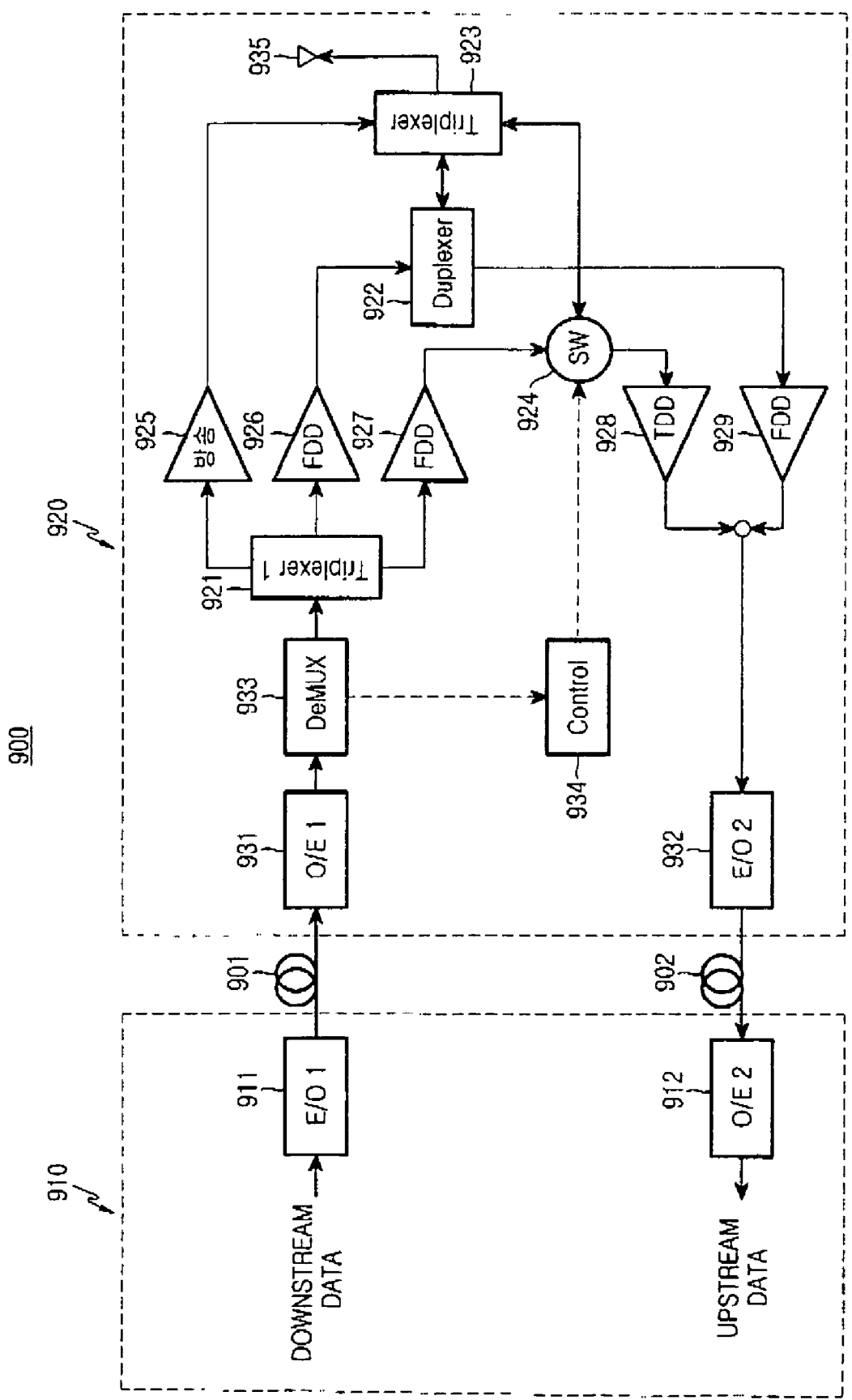
FIG. 13 is a schematic block diagram showing the structure of an optical network for bi-directional communication according to the seventh embodiment of the present invention.

FIG. 13 illustrates a schematic block diagram showing the structure of an optical network for bi-directional communication according to a seventh embodiment of the present invention. Referring to FIG. 13, the optical network 900 for the bi-directional wireless communication according to this embodiment of the present invention includes a central station 910 for photo-electric converting upstream optical signals into upstream data so as to detect the upstream data and for electric-optically converting downstream data into downstream optical signals so as to transmit the downstream optical signals, a remote access unit 920, and first and second optical cables 901 and 902 for linking the remote access unit 920 and the central station 910. The central station 910 includes a downstream electric-optical converter 911 and an upstream photo-electric converter 912.

The remote access unit 920 includes an antenna 935 for receiving upstream data and for transmitting downstream data, an upstream electric-optical converter 932 for converting the upstream data into upstream optical signals so as to output the upstream optical signals toward the second optical cable 902, a downstream photo-electric converter 931 for converting the downstream optical signals inputted through the first optical cable 901 into downstream data, a switch 924, a controller 934, a demultiplexer 933, first and second triplexers 921 and 923, a duplexer 922, first, second and third downstream amplifiers 925, 926 and 927, and first and second upstream amplifiers 928 and 929.

The demultiplexer 933 divides control signals from the downstream data, which outputs the control signals to the controller and transmits the remaining downstream data toward the first triplexer 921.

The first triplexer 921 divides the downstream data inputted from the demultiplexer 933 into downstream time division channels, downstream frequency division channels, and broadcasting channels. The downstream time division channels, divided from the downstream data, are inputted into the switch 924.

The second triplexer 923 combines the downstream time division channels inputted from the switch 924, the downstream frequency division channels divided by the first triplexer 921, and the broadcasting channels with the downstream data and then outputs the downstream data toward the antenna 935. The second triplexer 923 further divides the upstream data inputted from the antenna 935 into upstream frequency division channels and upstream time division channels and outputs the upstream time division channels to the switch 924.

The duplexer 922 outputs the downstream frequency division channels divided by the first triplexer 921 toward the second triplexer 923, while receiving the upstream frequency division channels from second triplexer 923.

The first downstream amplifier 925 is located between the first triplexer 921 and the second triplexer 923, and amplifies and outputs the broadcasting channels to the second triplexer 923. The second downstream amplifier 926 is disposed between the first triplexer 921 and the duplexer 922, and amplifies and outputs the downstream frequency division channels to the duplexer 922. The third downstream amplifier 927 is located between the first triplexer 921 and the switch 924, and amplifies and outputs the downstream time division channels to the switch 924.

The first upstream amplifier 928 is located between the switch 924 and the upstream electric-optical converter 932, and amplifies and outputs the upstream time division channels inputted from the switch 924 toward the electric-optical converter 932. The second upstream amplifies 929 is disposed between the duplexer 922 and the upstream electric-optical converter 932; and amplifies and outputs the upstream frequency division channels toward the upstream electric-optical converter 932.

The controller 934 controls the switch 924 depending on the control signals, so as to prevent the downstream time division channels and the upstream time division channels from overlapping.

The remote access unit according to the present invention respectively amplifies time division channels and frequency division channels, and then combines or transmits the channels, thereby preventing nonlinear phenomenon of active elements from occurring due to a leakage of downstream signals and also limiting deterioration of upstream link members which may be caused by the leakage of the downstream signals. That is, the remote access unit according to the present invention can prevent a part of downstream data from being introduced into the upstream link, thereby minimizing nonlinear phenomenon which may occur as elements processing upstream data using downstream data operates in a benefit saturation region or below a threshold.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A remote access unit for transmitting downstream data and receiving upstream data, wherein the downstream and upstream data include multiplexed channels having different transmission schemes, comprising:

an antenna for receiving the downstream data and wirelessly transmitting same and for receiving the upstream data and providing same into the remote access unit;

a switch receiving downstream time division channels demultiplexed from the downstream data and providing the downstream time division channels to the antenna and receiving upstream time division channels demultiplexed from the upstream data inputted through the antenna; and a controller for controlling the switch in order to prevent the upstream and downstream time division channels from overlapping;

a first duplexer for demultiplexing the downstream data into downstream time division channels and downstream frequency division channels and outputting the downstream time division channels to the switch;

a triplexer for:
  demultiplexing the upstream data received through the antenna into upstream time division channels and upstream frequency division channels; and multiplexing the downstream time division channels received from the switch and the downstream frequency division channel inputted from the first duplexer and providing the multiplexed downstream time division and frequency divisions to the antenna; and
  a second duplexer for combining the upstream time division channels received from the switch and the upstream frequency division channels inputted from the triplexer, into the upstream data.

2. The remote access unit as claimed in claim 1, further comprising:
  a downstream amplifier for amplifying and outputting the downstream data to the first duplexer; and
  an upstream amplifier for amplifying the upstream data outputted from the second duplexer.

3. The remote access unit as claimed in claim 1, further comprising:
  a first downstream amplifier for amplifying and outputting the downstream frequency division channels demultiplexed by the first duplexer to the triplexer;
  a second downstream amplifier for amplifying and outputting the downstream time division channels demultiplexed from the downstream data by the first duplexer to the switch;
  a first upstream amplifier for amplifying and outputting the upstream frequency division channels demultiplexed by the triplexer; and
  a second downstream amplifier located between the switch and the second duplexer, for amplifying and outputting the upstream time division channels inputted from the switch to the second duplexer.

4. A remote access unit for transmitting downstream data and receiving upstream data, wherein the downstream and upstream data include multiplexed channels having different transmission schemes, comprising:
  an antenna for receiving the downstream data and wirelessly transmitting same and for receiving the upstream data and providing same into the remote access unit;
  a switch receiving downstream time division channels demultiplexed from the downstream data and providing the downstream time division channels to the antenna and receiving upstream time division channels demultiplexed from the upstream data inputted through the antenna; and
  a controller for controlling the switch in order to prevent the upstream and downstream time division channels from overlapping;
  a first triplexer for dividing the downstream data into broadcasting channels, downstream time division channel and downstream frequency division channels and outputting the downstream time division channels to the switch;
  a second triplexer for:
    dividing the upstream data received through the antenna into upstream time division channels and upstream frequency division channels and outputting the upstream time division channels to the switch, and
    combining the broadcasting channel inputted from the first triplexer and the upstream time division and frequency division channels with the downstream data and outputting the downstream data to the antenna; and
  a duplexer for outputting the downstream frequency division channels inputted from the first triplexer to the second triplexer and for receiving the upstream frequency division channels divided by the second triplexer.

5. The remote access unit as claimed in claim 4, further comprising:
  a downstream amplifier for amplifying and outputting the downstream data to the first triplexer; and
  an upstream amplifier for amplifying the upstream time division channels inputted through the switch and the upstream frequency division channels received from the duplexer.

* * * * *

UNITED STATES PATENT AND TRADEMARK OFFICE
CERTIFICATE OF CORRECTION

PATENT NO.        : 7,630,694 B2
APPLICATION NO. : 11/395806
DATED             : December 8, 2009
INVENTOR(S)       : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 747 days.

Signed and Sealed this

Second Day of November, 2010

David J. Kappos
*Director of the United States Patent and Trademark Office*